United States Patent [19]
Adams

[11] Patent Number: 5,222,181
[45] Date of Patent: Jun. 22, 1993

[54] FRAUNHOFER LINE LASER TRANSMITTING SYSTEM

[75] Inventor: Gregory L. Adams, San Diego, Calif.

[73] Assignee: The United States of America as represented by the Secretary of the Navy, Washington, D.C.

[21] Appl. No.: 907,267

[22] Filed: Jul. 1, 1992

[51] Int. Cl.$^5$ .............................................. G02F 1/37
[52] U.S. Cl. ...................................... 385/122; 372/22
[58] Field of Search .................. 385/24, 88, 115, 122, 385/141–145; 372/6, 22, 28, 32

[56] References Cited

U.S. PATENT DOCUMENTS

| | | |
|---|---|---|
| 4,050,819 | 9/1977 | Lichtman . |
| 4,573,214 | 2/1986 | Mooradian . |
| 4,731,787 | 3/1988 | Fan et al. . |
| 4,919,382 | 4/1990 | Forman . |
| 5,013,151 | 5/1991 | Hughes . |
| 5,060,233 | 10/1991 | Harder et al. . |
| 5,062,150 | 10/1991 | Swanson et al. . |
| 5,067,134 | 11/1991 | Oomen . |
| 5,074,641 | 12/1991 | Nakai et al. . |
| 5,076,658 | 12/1991 | Hayden et al. . |
| 5,163,062 | 11/1992 | Moberg ............................ 372/108 |
| 5,181,212 | 1/1993 | Moberg ............................ 372/109 |

OTHER PUBLICATIONS

Bour et al, "980 nm Diode Laser for Pumping Er$^{3+}$-Doped Fiber Amplifiers", IEEE Photonics Technology Letters, vol. 2, No. 3, Mar. 1990, pp. 153–155, published in David Sarnoff Research Center publication of published papers.

Osterberg et al, "Dye laser pumped by Nd:YAG laser pulses frequency doubled in a glass optical fiber", Optics Letters, vol. 11, No. 8, Aug. 1986, pp. 516–518.

Mizrahi et al, "The mystery of frequency doubling in optical fibers:", Optics & Photonics News, Jan. 1991, pp. 16–20.

Primary Examiner—John D. Lee
Assistant Examiner—John Ngo
Attorney, Agent, or Firm—Harvey Fendelman; Thomas Glenn Keough; Michael A. Kagan

[57] ABSTRACT

A system is provided for generating a blue-green optical signal with a wavelength in the range of 450–550 nm and corresponding to a Fraunhofer line, comprising: a plurality of laser diodes, each laser diode generating a first optical signal having a first wavelength, $\lambda$; a plurality of optical fiber, each optical fiber having a first end optically coupled to receive the optical signal from one of the laser diodes and a second end for emitting a second optical signal having a second wavelength, $\lambda/2$, where the wavelength $\lambda/2$ corresponds to a Fraunhofer line, the second ends forming a fiber optic bundle for emitting a composite optical signal comprised of each of the second optical signals; a servo-controlled gimbal for supporting the fiber bundle to direct the direction of the composite optical signal; and a computer operably coupled to provide direction control signals to the servo-controlled gimbal.

8 Claims, 2 Drawing Sheets

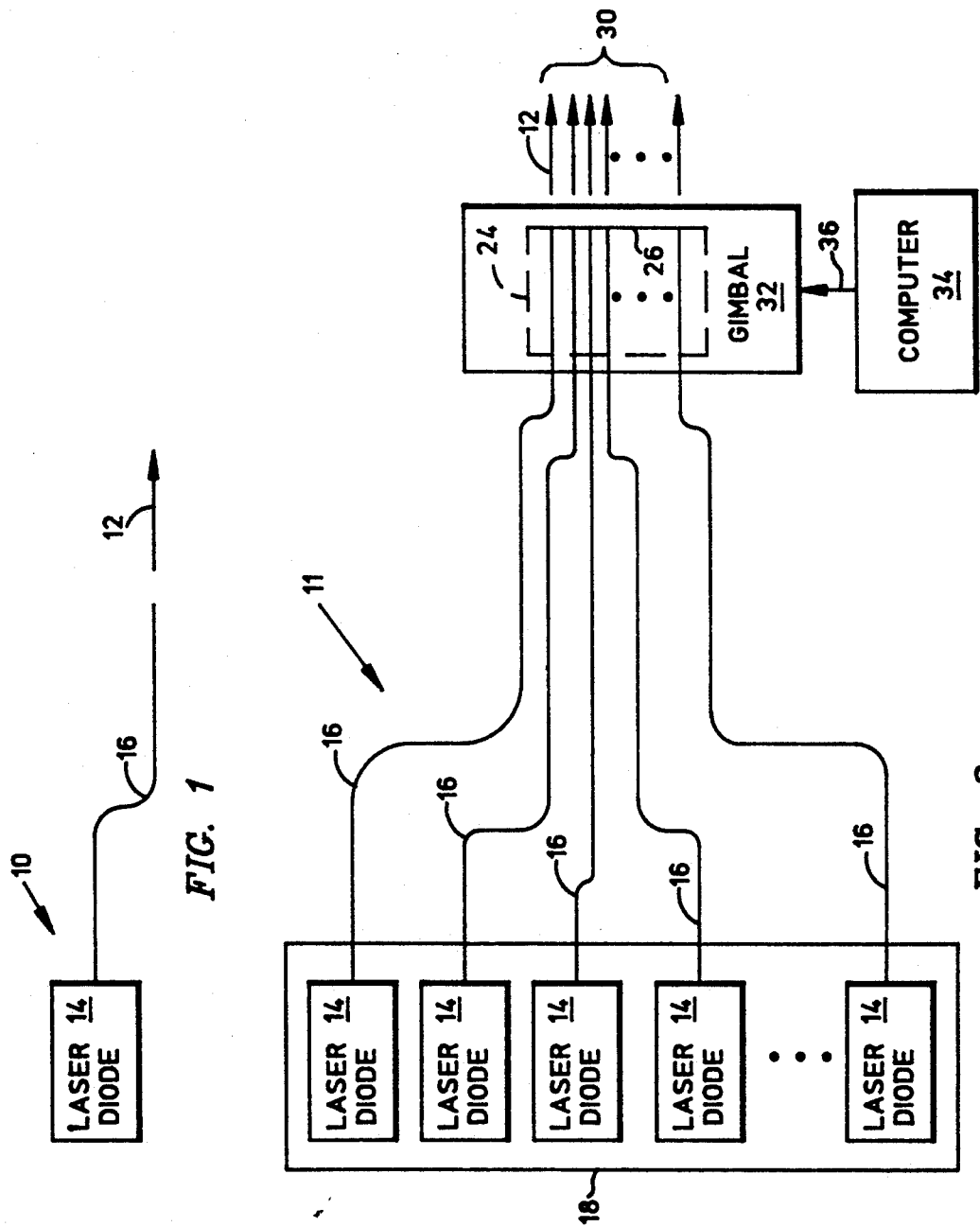

FRAUNHOFER LINE LASER TRANSMITTING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a system for generating blue-green light. More particularly, the invention employs the phenomenon of frequency doubling in an optical fiber to convert the infrared output of a semiconductor laser to blue-green light having a wavelength corresponding to a Fraunhofer line.

There are many applications where it is desirable to communicate through sea water, as for example, with submarines and underwater remote piloted vehicles. Because sea water is most transparent to the blue-green region of the electromagnetic spectrum, light falling within this region can be used as a communication medium. Generally, blue-green light is light having a wavelength from 450–550 nm, and blue-green light having a wavelength of about 490 nm has optimal transmissibility through sea water.

A significant problem associated with using blue-green light as a communication channel through seawater is that sunlight contains spectral components that compete with blue-green light and appears as background noise in the channel. The intensity of sunlight, and hence the degree of noise, varies with the wavelength of the light generated by the sun. For example, sunlight has a maximum intensity at approximately 500 nm, approximately in the middle of the blue-green portion of the electromagnetic spectrum, but has a relative minimum intensity at 486.13 nm. The wavelengths of sunlight at this and other relative intensity minima are referred to as Fraunhofer lines. Fraunhofer lines represent absorption lines in sunlight due to the cooler outer layers of the sun's atmosphere. These Fraunhofer lines are well understood and are catalogued in the *National Solar Observatory Atlas No.* 1, edited by R. Kurucz, et al. Though Fraunhofer lines of various spectral widths and depths occur throughout the visible spectrum, the line due to hydrogen absorption at 486.13 nm (known as the Hydrogen-Beta line) is among the broadest and deepest. Other lines of interest in the blue-green spectral region occur at 489.1 nm, 495.7 nm, 516.7 nm, 517.3 nm, and 518.4 nm. Thus, it may be appreciated that the signal-to-noise ratio of blue-green light may be increased by using blue-green light corresponding to a Fraunhofer line, and the transmissibility of such light through sea water may be maximized with blue-green light having a wavelength of about 486.13 nm.

U.S. Pat. No. 5,067,134 describes a device for generating blue laser light using a process known as upconversion in an optical fiber. In this process, a glass fiber is doped with an element that will absorb two or more pump photons and re-emit light at a wavelength that is not exactly half of the original wavelength. The device described in the '134 patent includes a semiconductor laser which emits a light beam having a wavelength of 650 nm and a power of 10 mW which is provided to a resonator. The resonator comprises a glass fiber optically coupled between first and second mirrors. The first mirror is transparent to light issuing from the laser. Light propagating through the first mirror is provided to an optical fiber and directed to the second mirror which exhibits limited transparency (approximately 5%) to the blue light generated in the glass fiber. The light beam issued by the resonator has a wavelength of 450 nm and a continuous power of maximally 0.5 mW. However, the wavelength at which this device is designed to operate is significantly lower (i.e., at a higher frequency) than the Fraunhofer line at 486 nm.

U.S. Pat. No. 5,050,233, "Miniature Blue-Green Laser Source Using Second-Harmonic Generation," describes a system and method for generating coherent blue-green light having a wavelength in the range of 490–500 nm. The system employs a diode laser which provides a beam having a wavelength in the range of 980–1000 nm to o an optical resonator which includes a nonlinear crystal of essentially KTP. The crystal produces blue-green radiation by non-critically phase-matched second-harmonic generation of the beam. The beam has a preferred wavelength of 994 nm for generating 497 nm radiation. The frequency of the laser is preferably matched and locked to that of the optical resonator. Since this system requires that the beam propagate at a fixed angle with respect to the optical axis of the crystal (the "Phase Matched" condition), systems of this type are especially sensitive to optical misalignment due to vibration. By necessity, the non-linear conversion process in the KTP crystal requires a very strong electric field which is attained by employing a very high intensity beam. Consequently, these systems require special design considerations to avoid heat damage.

Therefore, a need exists for a rugged, easily manufactured system which generates blue-green light having a wavelength in the range of 450–550 nm and substantially corresponding to a solar Fraunhofer line. More particularly, there is a need for a system for generating an optical signal having a wavelength corresponding to the Hydrogen-Beta Fraunhofer line at 486.13 nm.

SUMMARY OF THE INVENTION

The present invention provides a system for generating blue-green laser light with a wavelength corresponding to a solar Fraunhofer line and having good transmissibility through sea water so that the laser light has a high signal-to-noise ratio.

One embodiment of the invention includes a laser diode for generating a first optical signal having a wavelength of $\lambda$, and an optical fiber having a first end optically coupled to receive the optical signal from the laser diode and a second end for emitting a second optical signal having a wavelength, $\lambda/2$, corresponding to a Fraunhofer line. The second optical signal is produced by the optical fiber by the process of frequency doubling in the optical fiber.

Another embodiment of the system of the present invention includes multiple laser diodes each optically coupled to an optical fiber. The laser diodes generate an optical signal having a wavelength, $\lambda$. The optical fibers double the frequency of the output of the laser diode to provide an output having a wavelength of $\lambda/2$ corresponding to a Fraunhofer line. The emitting ends of the optical fibers are formed into a fiber optic bundle which emits a composite optical signal comprised of the optical signals emitted by the individual fibers. The fiber bundle is mounted in a servo-controlled gimbal which is computer controlled for directing or pointing the composite optical signal in a particular direction, or in a particular scan pattern.

An advantage of the system of the present invention is that it generates an optical signal at a wavelength having good transmissibility through sea water and which corresponds to a Fraunhofer line to maximize the signal-to-noise ratio of the optical signal.

The system of the present invention may be advantageously employed to generate an optical signal having a wavelength of about 486.13 nm to the optimize the transmissibility of the optical signal through sea water.

A still further advantage of the system of the present invention is that the use of the optical output at a fundamental frequency of the laser diode provides enhanced energy efficiency over systems that require the pumping a solid state laser.

The use of glass fibers for frequency doubling provides the further advantage of eliminating the need for costly and delicate non-linear optical crystals.

BRIEF DESCRIPTION OF THE DRAWINGS

FIG. 1 is a block diagram of an example of a system for generating an optical signal having a wavelength corresponding to a Fraunhofer line embodying various features of the present invention.

FIG. 2 is a block diagram of another example of a system for generating an optical signal having a wavelength corresponding to a Fraunhofer line in accordance with the present invention.

DESCRIPTION OF THE PREFERRED EMBODIMENT

Figure 3:
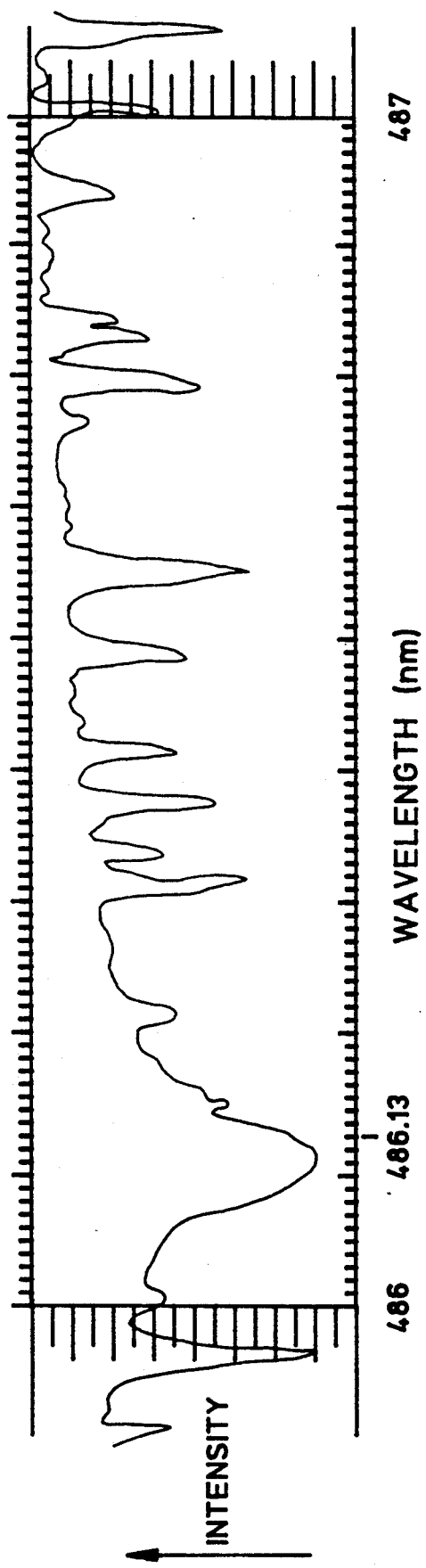
FIG. 3 is a graph of the intensity of solar irradiance as a function of wavelength showing the Hydrogen-Beta Fraunhofer line at 486.13 nm in the blue-green region of the electromagnetic spectrum.

Referring to FIG. 1, there is shown a system 10 for generating a blue-green optical output signal 12 at a solar Fraunhofer line which includes a laser diode 14 optically coupled to an optical fiber 16. Methods, such as the employment of a fiber "pigtail" for optically coupling an optical fiber to a laser diode are well known by those of ordinary skill in the art. The laser diode 14 generates an optical output signal 16 (hereinafter, it is to be understood that the signal conveyed by a particular element will be referred to as the "signal x," where x represents the reference number associated with that particular element) having a wavelength $\lambda$. The optical fiber 16 acts as a frequency doubler so that the signal 12 emitted from the end of the optical fiber has a wavelength of $\lambda/2$, where the frequency, f, and wavelength, $\lambda$, of the optical signal are related by the equation $C = \lambda f$, where C represents the speed of light in a vacuum (approximately $2.997 \times 10^8$ m/s) Thus, the frequency of the output signal 12 emitted by the optical fiber 16 is twice that of the signal 16 generated by the laser diode 14. The phenomenon of frequency doubling in optical fibers is described in Mizrahi, V., and Sipe, J. E., "The Mystery of Frequency Doubling in Optical Fibers," *Optics & Photonics News*, pages 16–20, January 1991.

By way of example, the laser diode 14 may be implemented as an index-guided strained InGaAs/AlGaAs quantum well semiconductor diode laser, which can be fabricated to operate at wavelengths between 900 and 1100 nm, as for example, at 972.26 nm, 978.2 nm, 991.4 nm, 1033.4 nm, 1034.6 nm, and 1036.8 nm so that the wavelength of the output signal 12 has a wavelength of 486.13 nm, 489.1 nm, 495.7 nm, 516.7 nm, 517.3 nm, and 518.4 nm, respectively. In the preferred embodiment, the laser diode 14 is fabricated to operate at 972.26 nm so that the frequency of the output signal 16 at $3.08 \times 10^{14}$ Hz is doubled to $6.16 \times 10^{14}$ Hz by the optical fiber 16 so that the output signal 12 has a wavelength of 486.13 nm, a particularly advantageous wavelength because it corresponds to a blue-green region in the solar spectrum associated with a minimum solar intensity and which has good transmissibility through sea water. The fabrication of such diodes is described in Bour, D. P., et al., "980 nm Diode Laser for Pumping $Er^{3+}$-Doped Fiber Amplifiers," *IEEE Photonics Technology Letters*, Vol. 2, No. 3, March 1990. Laser diodes suitable for employment in the system 10 may be obtained from the David Sarnoff Research Center, Princeton, N.J. Such laser diodes generally each have an output power of up to about 100 mW. However, it is to be understood that there may be other applications in which it would be desirable to generate blue-green light having a wavelength corresponding to a Fraunhofer line other than that at 486.13 nm. In such case, the laser diode 14 should be fabricated to generate an optical output signal having a wavelength which is twice that of the particular Fraunhofer line of interest.

Referring now to FIG. 2, there is shown a system for generating blue-green light 12 having a wavelength corresponding to a Fraunhofer line and which has good transmissibility through sea water that includes one or more systems 10. Generally blue-green light having a wavelength in the range of 450–550 nm has good transmissibility through sea water. The system 11 preferably includes multiple laser diodes 14 grouped into an array 18, where each laser diode is optically coupled to a frequency doubling optical fiber 20. The output ends 22 are joined to form a preferably cylindrically shaped fiber bundle 24 with a polished, substantially circular end face 26. Preferably, the optical axes of the output ends of each optical fiber 16 are parallel to one another so that the composite optical signal 30 comprised of the individual optical signals 12 behaves as though it were a single beam of light having an intensity which is the sum of all of the individual optical signals 12. Fiber bundles are well known and have been used in medical, oscilloscope and communications applications. [See for example, U.S. Pat. No. 5,013,151, incorporated herein by reference]

The optical fiber 16 may be a single mode optical glass fiber codoped with germanium and phosphorus, or as described in Osterberg, U. and Margulis, W., "Dye Laser Pumped by Nd:YAG Laser Pulses Frequency Doubled In A Glass Optical Fiber," *Optics Letters*, Vol. 11, No. 8, August 1986.

The fiber optic bundle 24 may be mounted in a servo-controlled gimbal 32 under the control of a computer 34 via direction controls signals 36 so that the composite optical signal 30 may be conveniently directed or pointed to irradiate the surface of the sea, or other body of water at a particular area of interest. By way of example, the gimbal 32 may be implemented as a multi-post yoke gimbal of the type described in U.S. Pat. No. 4,919,382, incorporated herein by reference.

In one application of the system 11, it may be desirable to employ blue-green light as a communication medium between an aircraft and a receiver positioned beneath the surface of the sea. In such case, the system 11 may be located on board a moving or stationary aircraft whereby the gimbal 32 is controlled by the computer 34 to direct the composite optical signal 30 emitted by the fiber bundle 26 to scan the surface of the sea along a predetermined path, or to fixate on a specific location on the sea surface. The development of software which may be implemented in the computer 34 suitable for controlling the gimbal 32 is well within the level of ordinary skill in the art.

Obviously, many modifications and variations of the present invention are possible in light of the above teachings. It is therefore to be understood that within the scope of the appended claims, the invention may be practiced otherwise than as specifically described.

I claim:

1. A system for generating a blue-green optical signal with a wavelength in the range of 450-550 nm and substantially corresponding to a Fraunhofer line, comprising:
    a laser diode for generating a first optical signal having a first wavelength, $\lambda$; and
    an optical fiber having a first end optically coupled to receive said optical signal from said laser diode and a second end for emitting a second optical signal having a second wavelength, $\lambda/2$, where said wavelength $\lambda/2$ corresponds to a Fraunhofer line.

2. The system of claim 1 wherein the first wavelength is within the range of about 900 nm to 1100 nm.

3. The system of claim 2 wherein said first wavelength is about 972.26 nm.

4. The system of claim 3 wherein said laser diode is an index-guided strained InGaAs/AlGaAs quantum well semiconductor diode laser.

5. A system for generating a blue-green optical signal with a wavelength in the range of 450-550 nm and substantially corresponding to a Fraunhofer line, comprising:
    a plurality of laser diodes, each laser diode generating a first optical signal having a first wavelength, $\lambda$;
    a plurality of optical fibers, each said optical fiber having a first end optically coupled to receive said optical signal from one of said laser diodes and a second end for emitting a second optical signal having a second wavelength, $\mu/2$, where said wavelength $\mu/2$ corresponds to a Fraunhofer line, said second ends forming a fiber optic bundle for emitting a composite optical signal comprised of each of said second optical signals;
    a servo-controlled gimbal for supporting said fiber bundle to direct the direction of said composite optical signal; and
    a computer operably coupled to provide direction control signals to said servo-controlled gimbal.

6. The system of claim 5 wherein said first wavelength is within the range of about 900 nm to 1100 nm.

7. The system of claim 6 wherein said first wavelength is about 972.26 nm.

8. The system of claim 7 wherein said laser diode is an index-guided strained InGaAs/AlGaAs quantum well semiconductor diode laser.

* * * * *